United States Patent [19]

Innes

[11] Patent Number: 5,709,029
[45] Date of Patent: Jan. 20, 1998

[54] MANUFACTURE OF HELICALLY CORRUGATED CONDUIT

[75] Inventor: Rodney Mitchell Innes, Auckland, New Zealand

[73] Assignee: Energy Saving Concepts Limited, Auckland, New Zealand

[21] Appl. No.: 801,713

[22] Filed: Feb. 14, 1997

Related U.S. Application Data

[63] Continuation of Ser. No. 408,486, filed as PCT/NZ93/00087, Sep. 22, 1993, abandoned.

[30] Foreign Application Priority Data

Sep. 22, 1992 [NZ] New Zealand ............................ 244431

[51] Int. Cl.[6] .................................................. B23P 15/00
[52] U.S. Cl. ........................ 29/890.053; 29/890.048; 29/727
[58] Field of Search ................... 29/890.048, 890.053, 29/726, 727, 33 G, 33 T; 72/96, 98, 100, 89, 110, 136, 137

[56] References Cited

U.S. PATENT DOCUMENTS

| | | |
|---|---|---|
| 2,374,609 | 4/1945 | McCollum . |
| 3,559,437 | 2/1971 | Withers, Jr. ............... 29/890.048 |
| 3,602,027 | 8/1971 | Klug ............................ 29/890.048 |
| 3,730,229 | 5/1973 | D'Onofrio . |
| 3,750,444 | 8/1973 | Bittner ....................... 29/890.048 |
| 4,403,385 | 9/1983 | Kirk ............................. 29/890.048 |
| 4,559,999 | 12/1985 | Servas et al. . |
| 4,616,391 | 10/1986 | Cunningham et al. ........... 29/890.048 |
| 4,692,978 | 9/1987 | Cunningham et al. ........... 29/890.048 |
| 4,765,058 | 8/1988 | Zohler ......................... 29/890.048 |
| 4,866,830 | 9/1989 | Zohler ......................... 29/890.048 |
| 5,010,643 | 4/1991 | Zohler ......................... 29/890.048 |

FOREIGN PATENT DOCUMENTS 1511718  5/1978  United Kingdom .

Primary Examiner—Irene Cuda
Attorney, Agent, or Firm—Woodbridge & Associates

[57] ABSTRACT

This invention concerns the manufacture of helically corrugated conduit having at least a portion of its length corrugated in the form of at lease one helix. The method includes the driving of a smooth walled tube into a forming head having forming wheels which engage the outside of the tube and the wheels are at an angle relative to the longitudinal axis of the tube. The forming wheels form the helical spiral as part of a cold rolled forming process. More than one helical spiral can be formed simultaneously using a multiplicity of forming wheels.

8 Claims, 3 Drawing Sheets

5,709,029

MANUFACTURE OF HELICALLY CORRUGATED CONDUIT

This application is a continuation of application Ser. No. 08/408,486, filed as PCT/NZ93/00087 Sep. 22, 1993, now abandoned.

This invention relates to the manufacture of helically corrugated conduits and conduits made by that method such as heat exchange conduits used to exchange heat from one fluid to another, in liquid to gas, gas to gas or liquid to liquid heat exchange and also the drying of powders or any other uses where a helical spiralled tube is of assistance such as electrical element housing tube.

A number of conduits incorporating a helical spiral or even a multi-start helix in the wall of the conduit are known. Such tubes or conduits are variously described in apparatus in specification numbers GB1511718, GB2374609, U.S. Pat. No. 3,730,229 and U.S. Pat. No. 4,559,999.

Of these specifications, only U.S. Pat. No. 3,730,229 goes into some detail on the method of manufacture of such a conduit. The method disclosed An that specification involves creating indentations in the tube to act as starting points for the helical spiral and then the simultaneous twisting and longitudinal compression of the tube over an internal mandrel and within an exterior tube. Such a method is both complex, time consuming and can lead to the twisted helical conduit being Jammed within the outer tube.

Both this prior art method of manufacture and others suggested by twisting the conduit can lead to conduits of uneven wall thickness and uneven stresses within the finish conduit. This can lead to breakage during manufacture and failure of the conduit in use.

OBJECTS OF THE INVENTION

It is thus an object of the present invention to provide a method of manufacture of a helically corrugated conduit and a conduit so manufactured with a relatively constant wall thickness and/or which is more economic than the prior art methods.

It is a further object of this invention to provide a helically corrugated conduit and a method of manufacture of said heat helically corrugated conduit which comes some way in overcoming the abovementioned problems or at least wall provide the public with a useful choice. Other objects of this invention will become apparent from the following description.

SUMMARY OF THE INVENTION

According to a first aspect of this invention, there is provided a method of manufacturing a helically corrugated conduit incorporating at least one helical undulation thereon and including the steps of:

i) positioning a portion of substantially smooth walled tube formed in a malleable material on a support means ii) positioning at least one forming wheel with at least its outer periphery in contact with a surface of said tube with the axis of said wheel mounted at an angle relative to a longitudinal axis of said tube; and iii) rotating said tube and/or forming wheel one relative to the other to form a wave of material from a wall portion of said tube adjacent said forming wheel to longitudinally undulate a portion of said tube wall substantially helically.

Accordingly, in a second aspect, the invention consists in a method of forming a smooth walled tubular conduit of formable material into a conduit incorporating at least one helical spiral in the wall of a longitudinal portion of said conduit by cold rolled forming.

Accordingly, in a third aspect, the invention consists in a method of manufacturing a heat exchange conduit from a smooth walled tube of formable material comprising the steps of:

i) progressing said tube along a support means supporting said tube;

ii) engaging a portion of the outer periphery of at least one forming wheel with said tube;

iii) rotating said tube or said forming wheel or both one with respect to the other; and iv) wherein said tube is progressed against said forming wheel under a pressure such that said forming wheel forms a helical spiral in the wall of said tube to form said conduit.

Modifications are envisaged and may be incorporated without departing from the scope or spirit thereof.

BRIEF DESCRIPTION OF THE DRAWINGS

One form of the invention will now be described in relation to the accompanying drawings in which.

DESCRIPTION OF PREFERRED EMBODIMENTS

Figure 2:
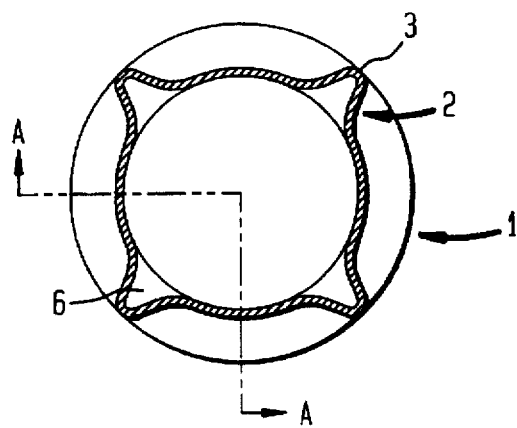
FIG. 2 is a diagrammatic end view of the conduit of FIG. 1.
Figure 1:
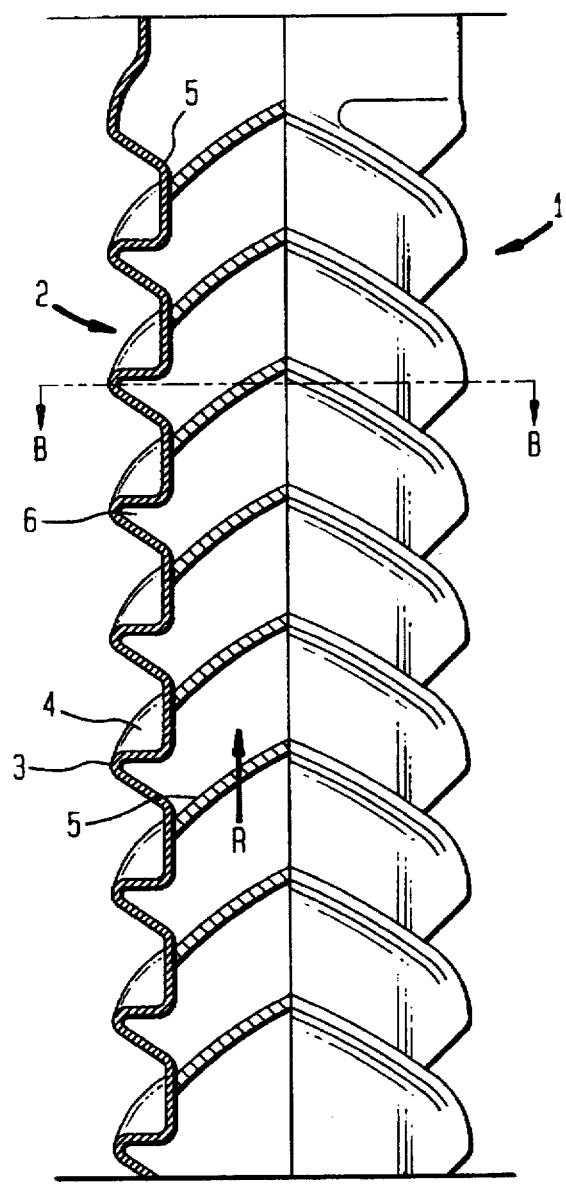
FIG. 1 is a partial cutaway substantially diagrammatic side view of one embodiment of the conduit of this invention.

With reference to the drawings, in the preferred form of the invention, the conduit as generally indicated by arrow 1 is preferably formed in a thermally conductive material such as metal; for example copper, stainless steel, aluminium and the like, being preferably a substantially malleable or formable material if it is to be used as a heat exchange conduit. Other materials for heat exchange or other uses may be substituted. It is possible to use the method on plastic tubing and also plastic lined tubing. The forming method can form the plastic lining with the tubing in one operation.

With particular reference to FIGS. 1 to 5, a heat exchange conduit 1 produced by the method of manufacture is in the preferred formed from substantially smooth walled copper tube and is arranged along at least a portion of the length of the tube to have a substantially helically ribbed portion as generally indicated by arrow 2.

It will be appreciated that the undulations substantially increase the surface area to length ratio of the tube over the substantially smooth walled tube and enhance the thermal-conductivity of the tube relative to its length in view of the increase in surface area.

The heat exchange conduit 1 is preferably provided with undulations which have outer ribs 3 thereof which project outwardly of a general peripheral line of the tube from which the heat exchange conduit 1 is made. The undulations are each preferably defined as a plurality of helical ribs 3 extending about and longitudinally of the conduit 1 coupled with an associated groove 4 which, in this preferred form extends inwardly into the interior of the tube to define a plurality of internal ribs 5 therein.

In the preferred form of the invention, the extent of outward projection of the ribs 3 is substantially commensurate with an outer preferred diameter of the finished heat exchange conduit 1.

Preferably the inner ribs 5 are such that they are substantially commensurate with a normal inner diameter of the tube from which the heat exchange conduit 1 is formed. In this way, it will be appreciated that the formation of the conduit 1 does not reduce its cross-sectional area and perhaps create an undue restriction therein. Internal grooves 6 defined between the internal ribs 5 enable a flow of fluid through the interior of the conduit passageway to extend into the ribs 3, to provide a high ratio of surface area to length of the tube conduit 1 and good heat transfer properties therein, as fluid flows through the passageway of the conduit.

In the preferred form of the invention, preferably the helical ribbing 3 of the tube to provide the conduit 1 is provided as a plurality (preferably four) of helical ribs 3 each commencing in a similar longitudinal position relative to said tube, substantially diametrically opposed one relative to the other so as to provide a form substantially known in the trade as "multistart" helixes.

Figure 3:
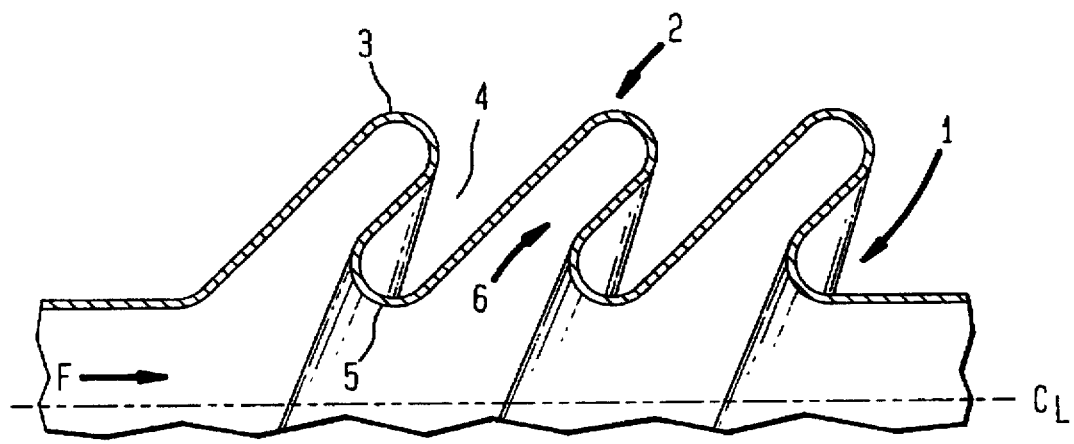
FIG. 3 is a substantially diagrammatic cross-sectional side view of a further embodiment of a portion of conduit.
Figure 4:
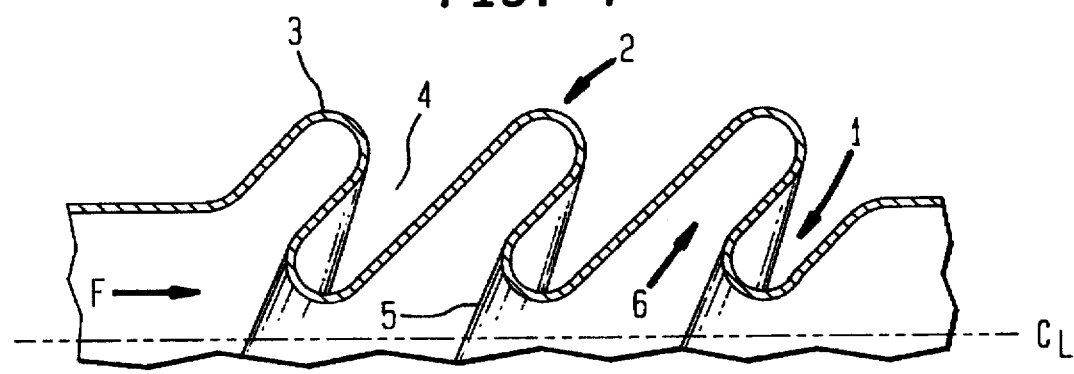
FIG. 4 is a similar view to that of FIG. 3 showing a still further embodiment of conduit.
Figure 5:
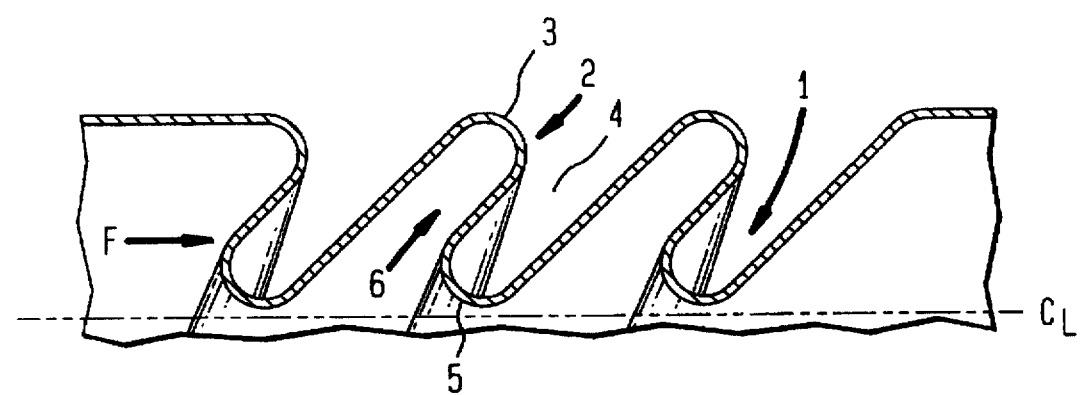
FIG. 5 is a similar view to that of FIGS. 3 and 4 showing a still further embodiment of conduit.

Referring now to FIGS. 3, 4 and 5, it is envisaged that the conduit 1 and its undulations can be alternatively formed. By way of example only, FIG. 3 shows substantially cross-sectionally a portion of a wall of a conduit 1 which is particularly suited to gas-to-fluid heat exchange. The gas is positioned externally of the conduit 1, and with the undulations, being closely defined leaving only a small groove for liquid with an enhanced surface area to length ratio over the form of FIG. 1. Such an arrangement would be particularly suited to motor vehicles radiators, space heating apparatus and refrigerator condenser cores.

With reference to FIG. 4, it is envisaged that in certain instances, such as where greater need for prevention of "streaming" is required, that the undulating portions of the conduit 1 can be provided and positioned so that internal ribs 5 thereof are mounted substantially inwardly, out of register with remaining portions of the tube, from which the conduit 1 is formed. It wall be appreciated that this causes an increased interference to the flow of the fluid through the conduit 1, and a greater turbulating action to the fluid passing therethrough as a result.

In the preferred form of the invention, a flow of fluid through the passageway of the conduit is preferably in the direction of arrow F as is shown by FIGS. 1 to 5. It will be appreciated that with a flow in this direction, and with the particular shape of the associated ribs 5 and recesses 6 internally thereof, there is an enhanced tendency for fluid to flow into recesses 6 and turbulate, scroll or rotate therein flows through the passageway.

It is to be appreciated that a varying of the shape of the undulations may enable more efficient flow from a substantially opposite direction from described and therefore the invention is not the flow direction as shown and described with reference to FIGS. 1 to 5.

It is envisaged that each piece of conduit will be provided with a short spigot portion preferably adjacent each end thereof formed in substantially smooth walled tube, to thus facilitate the convenient connection of such conduits with other portions of apparatus utilising substantially known fittings and techniques.

The conduit 1 may be used as an electrical element housing tube within water heaters such as kettles or cylinders.

Now turning to FIGS. 6, 7 and 8, a method of forming the conduit 1 will be described.

Figure 6:
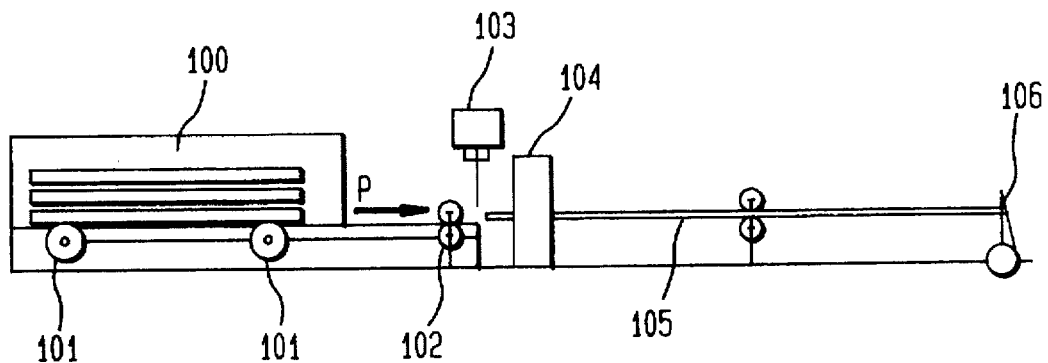
FIG. 6 is a substantially diagrammatic side view of an apparatus for manufacturing the conduit in one embodiment.
Figure 7:
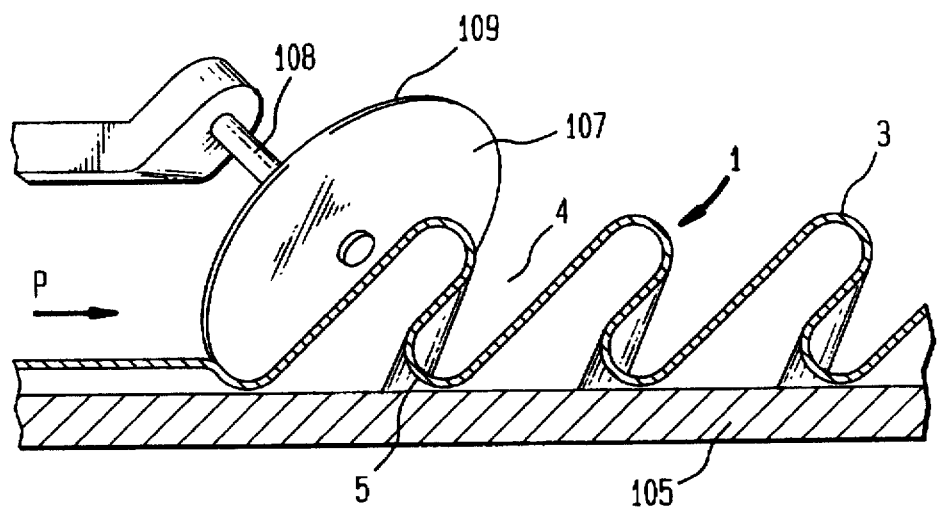
FIG. 7 is a substantially diagrammatic cross-sectional side view of a portion of the forming head of the apparatus of FIG. 6.
Figure 8:
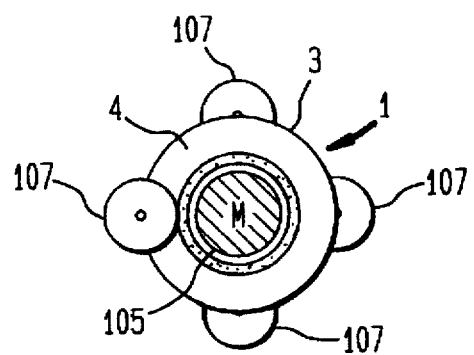
FIG. 8 is a substantially diagrammatic end view of the forming head of FIG. 7 viewed substantially longitudinally of the apparatus of FIG. 5.

With reference to FIGS. 6, 7 and 8, and in particular FIG. 6, it is to be appreciated that the conduit 1 is preferably formed from tubular metal material, such as copper, which is provided in substantially selected lengths and is positioned in a magazine 100. The magazine 180 is arranged by rollers 101 and associated selection means (not shown) to progressively feed a mingle length of smooth walled tubular material into drive rollers 102 mounted between the magazine 100 and a cutoff means 103 adjacent a forming head 104. The drive rollers 102 in the preferred form of the invention preferably drive the selected length of tubular material through the forming head 104 whereupon the undulating form of the conduit 1 is cold roll-formed thereon as said tube positions and is pushed over an elongate mandrel means 105 which extends from a remote stop portion 106.

If only a shallow corrugation is required, it is possible to dispense with the mandrel and support the tubing on other support means such as rollers.

Preferably suitable actuating means and stop means are provided adjacent the mandrel stop, drive rollers, cut off means and the like so as to enable a sequence operation to occur and enable substantially automated production of the conduit i according to a predetermined design.

Turning now particularly to FIGS. 7 and 8, the forming head 104 of FIG. 6 in the preferred form of the invention preferably includes a plurality of diametrically arranged forming wheels 107 each radially arranged relative to the mandrel 105 of the forming head 104.

Preferably, each forming wheel is mounted substantially as is shown by FIG. 7, at an angle and with its rotational axis inclined relative to the longitudinal axis of the mandrel and therefore the conduit 1 positioned thereon.

Adjustment of the angle of the forming wheel 107 can change the pitch and depth of the corrugations in the finished conduit.

Preferably peripheral portions 109 of the each wheel 107 are each so shaped to engage with outer surfaces of the tube from which the conduit 1 is formed and to run thereon said wheels 107 are each mounted substantially out of line with a normal rolling run of said periphery 109 so that when the tube is positioned over said mandrel 105 and said roller 107 periphery 109 is brought into contact with exterior surface of the tube, a "wave" of material is developed downstream of said roller 107 and a surface of the tube is formed into the undulations described hereinbefore in relation to FIGS. 1 to 5 upon the relative rotation of said tube and said wheels 107.

It will be appreciated that the rollers 107 are each mounted remove to and from the operative position to enable feeding of the tube onto the mandrel 105 end prior no formation. It is also no be appreciated the drive rollers 102 in the preferred form of the invention provide a sufficient degree of pressure P in the direction of arrow P of FIGS. 6 and 7 so that the "wave" of tube material is formed by each of the rollers or wheels 107 as the drive rollers 102 force the tubular material over the mandrel 105 and maintain pressure against the rollers 107. The pressure required will vary according to the type of material used, the thickness of the wall of the tubing and the corrugation desired.

It will be appreciated that by this method a substantially quadruple start helix is provided on the conduit. It should be appreciated that as many "starts" as may be required may be provided, subject to sufficient rollers 107 being able to be arranged substantially radially of the mandrel 105 and in the forming head 104. In some instances, particularly with larger tubing, it may be desirable to use more than one forming wheel to form each helical spiral. For example, eight forming wheels for a four start helix.

The conduit resulting from this method of manufacture comprises a conduit of relatively uniform wall thickness through the cold rolled forming of the helical spirals. The spirals are created to form a finished conduit of shorter length than the length of initial smooth walled tube used in its creation. Other methods of manufacture may create uneven wall thicknesses and perhaps an uneven distribution of stresses throughout the finished conduit.

Thus, by this invention, there is provided an improved method of manufacture of a helically corrugated conduit providing for economic manufacture of a conduit incorporating a relatively simple design and a high ratio of surface area to length.

I claim:

1. A method of manufacturing a helically corrugated conduit from a smooth walled tube of formable material comprising the steps of:

supporting said tube on a support means;

engaging a portion of the outer periphery of at least one forming wheel against an outer surface of said tube and wherein said forming wheel engages said tube at an angle relative to a longitudinal axis of said tube;

rotating said tube or said forming wheel or both, one with respect to the other; and simultaneously moving said tube or said forming wheel to create movement between said forming wheel and said tube relative along the longitudinal axis of said tube under a pressure such that said forming wheel moves about an outer surface of said tube in a helical spiral forming corresponding deformations in both the outer and inner surfaces of said tube; and wherein a substantial portion of the inner surface of said corrugations in said conduit remain free from contact with an inner support throughout formation.

2. A method of manufacturing a helically corrugated conduit as claimed in claim 1 wherein said support means includes a mandrel within said tube and generally spaced from the inner surface of said tube.

3. A method of manufacturing a helically corrugated conduit as claimed in claim 1 wherein a plurality of helical spirals are formed in said tube by engaging a plurality of forming wheels with the outer surface of said tube.

4. A method of manufacturing a helically corrugated conduit as claimed in claim 1 wherein said forming process produces a helically spiraled tube of shorter length than the unformed tube from which it is made.

5. A method of manufacturing a helically corrugated conduit as claimed in claim 1 wherein said forming comprises cold rolled forming of the tube.

6. A method of manufacturing a helically corrugated conduit as claimed in claim 1 wherein the wall thickness of said tube remains substantially unchanged after said forming process.

7. A method of manufacturing a helically corrugated conduit as claimed in claim 1 wherein moving said tube and forming wheel relative to each other along the longitudinal axis of said tube comprises driving said tube by drive means along said support means.

8. A method of manufacturing a helically corrugated conduit as claimed in claim 1 wherein a portion of said tube remains unformed adjacent one end of said tube.

* * * * *